United States Patent

Stout

[15] 3,653,145

[45] Apr. 4, 1972

[54] ART OF CONTROLLING HOUSEFLIES

[72] Inventor: Daniel M. Stout, Kirkwood, Mo.

[73] Assignee: Whitmire Research Laboratories, Inc., St. Louis, Mo.

[22] Filed: Dec. 10, 1969

[21] Appl. No.: 883,788

[52] U.S. Cl. ............................................................43/131
[51] Int. Cl. ........................................................A01m 1/20
[58] Field of Search ............................................43/131, 129

[56] References Cited

UNITED STATES PATENTS 2,956,366   10/1960   Wiesmann ..............................43/131

FOREIGN PATENTS OR APPLICATIONS 1,511,316   12/1967   France ....................................43/129

Primary Examiner—Warner H. Camp
Attorney—Paul M. Denk

[57] ABSTRACT

Killing flies by suspending, in a fly-infested area, a strip of paper or the like which has holes in it, and which has an obverse surface colored with luminescent material overprinted with pictorial illustrations of clusters of flies in postures which arouse the curiosity of other flies, the pictorial illustrations and the luminescent coating on the strip being intervened by white fields of substantially similar perimetrical contour as the flies in the pictorial illustrations; and the obverse surface of said strip carries fly food-toxin which may also be colored with luminescent material.

14 Claims, 4 Drawing Figures

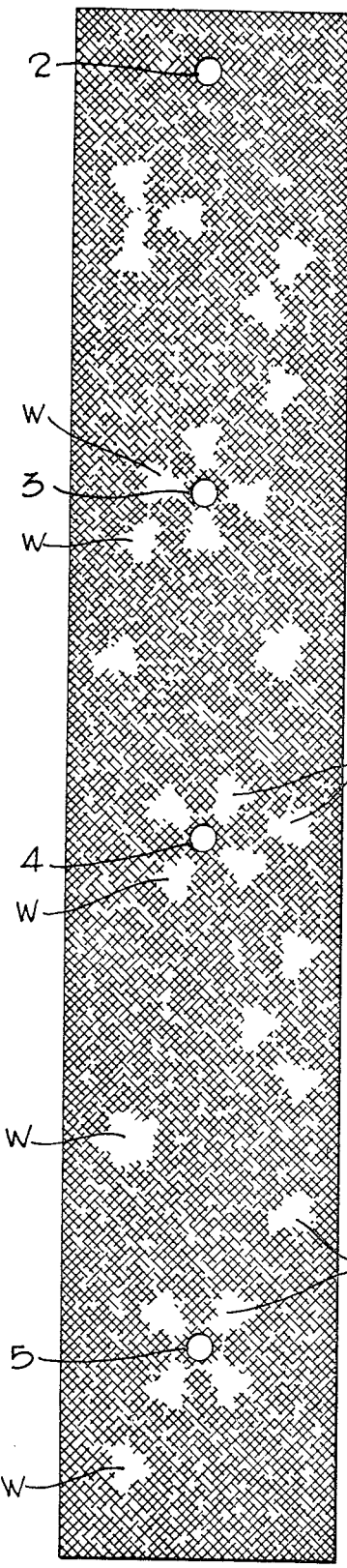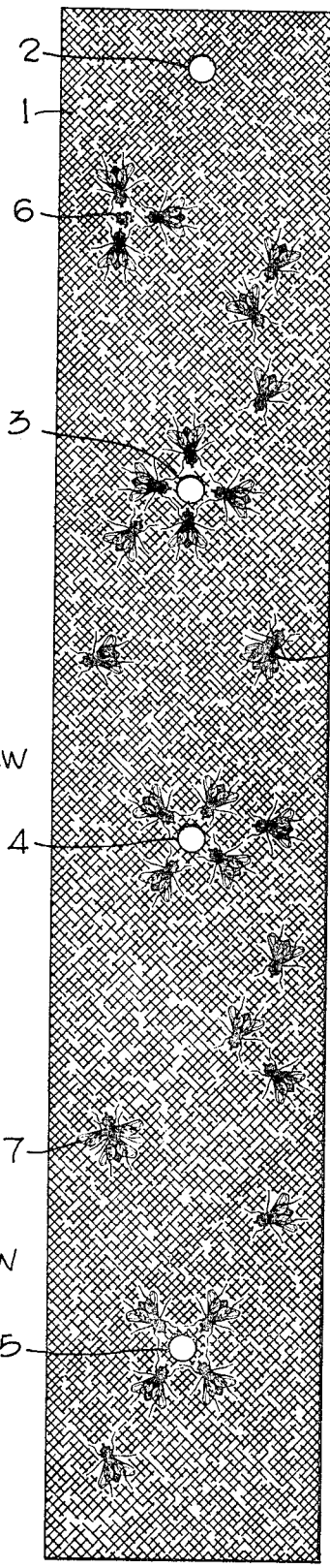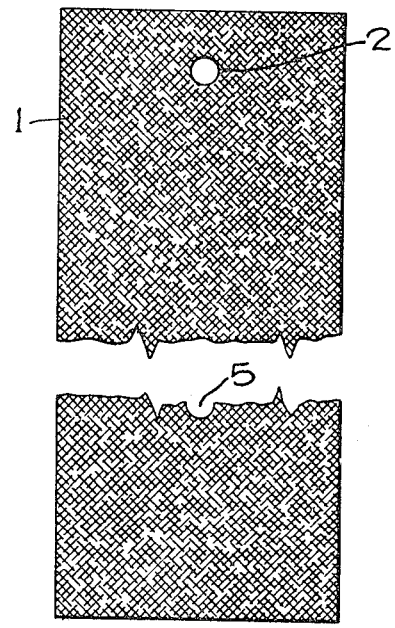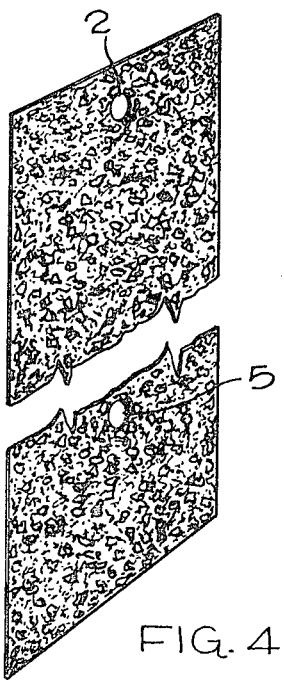
FIG. 1
FIG. 2
FIG. 3
FIG. 4
Inventor
DANIEL M. STOUT

ART OF CONTROLLING HOUSEFLIES

The invention relates generally to insect control, and particularly to a method and means of luring houseflies (*Musca domestica*) into the jaws of death.

Many a fly poison has been proposed — and most are quite effective, provided the fly is willing to cooperate by eating or drinking that of which humankind wants them to partake. On the other hand, flies are smart. At least, they often appear to deliberately shun that which humankind has prepared especially for them, while flocking to that which humankind has prepared for itself.

The object of the invention is therefore to draw flies — and having drawn them, to speed their demise. To effectively draw flies requires that an irresistible appeal be made to one or more of a fly's perceptive senses. Normally flies are drawn to food by the olfactory sense which is many times more keen than that of humans. Some investigation has heretofore been made of attracting flies through their visual sense, the mechanism of which is radically different from that of the mammal eye. Such investigations involved the response of houseflies to various colors, and the results of such investigations are noteworthy at least for their high degree of inconsistency. For example: in 1920, Awate reported that houseflies' highest preference for color was yellow, lowest preference red and violet, with blue, green and orange in between; in 1946, Harsham reported that flies' preference for color ranged from highest with silver foil down through light red, strawberry red, dark orange, lime green, light yellow, and purple, in that order; in 1948, Waterhouse reported red to be most attractive with dusty blue next, and with yellow and medium gray vying for third place, then green, light gray, sky blue and white, in that order of diminishing attractiveness; and in 1964, Howell rated them in the order of tan (highest), followed by yellow, brown and pink, with black, dark blue, red, and deep orange the least attractive. The inconsistency may now be explainable by my discovery that different ambient conditions, such as temperature, barometric pressure, air motion, time of day, humidity and light intensity do affect flies' psychological and physiological reaction to color which they visually perceive. For example, in tests carried out within dairy barns in daytime with no artificial light, I found orange to be the most effective color throughout the entire temperature range of 70°–95° F., which is the normal temperature for fly activity. I found red to be more effective than orange below 70° F.; silver to be more effective than orange at 85° F. and above; and black to be most effective at 58°–60° F. — a temperature at which flies' vision is impaired. In addition, I have discovered that color per se is a more fickle affector of flies' behavior than is the technique employed to make the color visible to the fly. For example, irrespective of color, I found surfaces which have a high capacity to reflect ultraviolet light to be more alluring to flies than surfaces which do not. Luminescent materials are excellent, as is "silver foil." Unlike conventional colorants, luminescent pigments possess the property of absorbing certain types of radiant energy (usually below 4,000 A. and not visible to the human eye), converting it into longer wave lengths in the visible spectrum, and emitting it as light. When the emission of luminescent light ceases with the removal of the exciting energy, the luminescent material is called fluorescent. If the emission of light continues for an appreciable period of time after the exciting energy is removed, the luminescent material is known as phosphorescent. Judging by the number of fly-specks deposited on test specimens (cf. Harsham, supra), under the dairy barn conditions aforesaid, fluorescent materials (which have the capacity to reflect ultraviolet light) are, during daylight, consistently more alluring to flies than phosphorescent ones. In the lure of my invention, the fly appeal of both color and reflected ultraviolet light is combined with graphic silhouettes resembling flies. Preferably, the graphic silhouettes are pictorial illustrations of flies in postures which, when assumed by live flies, seem to make other flies "nosey" and to arouse an instinctive response in them. However, substantially triangular black, or at least dark, spots of substantially fly-size are about as effective. The two postures which appear to have the greatest portent for enticing other flies to join the party are the posture of copulation (which lures nonparticipating, but jealous, male flies), and the posture of feeding (which lures the ever-hungry species regardless of sex). Accordingly, my invention contemplates the provision of a film or integument of paper, cloth, or other material, preferably having at least one hole extending through it, coated on the obverse side with a material which is luminescent or a good reflector of ultraviolet light, and on the reverse side with fly toxin containing food, and also provided on the obverse side, adjacent the hole, with life-size graphic silhouettes of the type aforesaid. Such a film, when suspended so that both sides are fly-accessible, allures flies to its obverse side where they join their illusory kind in pursuit of whatever they are looking for to satiate their whetted appetites, and failing to find real satisfaction on the obverse side, crawl through the hole or over the edge to investigate the reverse side where they find abundant food of which they can partake freely and without restraint by the foreknowledge that their pleasure is their poison.

The allure of the graphic silhouettes in substantially increased if the underlying luminescence, color and ultraviolet reflectance of the surface is masked. This may be readily accomplished by post-printing the colored luminescent surface of the lure with fields of substantially nonultraviolet-reflecting white ink where the graphic silhouhettes are to be subsequently over-printed in black. The substantially nonultraviolet-reflecting field is preferably of the same configuration as, but slightly larger than, the perimeter (legs and wings included) of each individual fly in the graphic silhouette.

The several steps of manufacturing one embodiment of the lure of the present invention are illustrated in the accompanying drawings, in which:

FIG. 1 is an interrupted obverse side elevation of luminescent orange-colored paper blank from which the lure is made;

FIG. 2 is an obverse side elevation showing the blank of FIG. 1 after having been perforated and the fields of white ink applied to obscure the luminescent color where the pictorial illustrations are to be subsequently overprinted;

FIG. 3 is a view corresponding to FIG. 2, but with the pictorial illustrations added; and FIG. 4 is an interrupted perspective view of the reverse side of the lure shown in the other figures.

In the embodiment illustrated in the drawings, the lure is made of a strip of paper 1 which has been coated with ink, lacquer, or other material which is a good reflector of incident ultraviolet light, and preferably has the characteristics of daylight fluorescence. Paper having such a coating on the obverse side, and a release-paper covered coating of pressure-sensitive adhesive on the reverse side, is obtainable as a regular article of commerce from Brown Bridge Mills, Inc., of Troy, Ohio, under the designation of "Strip-Tac-Fluoradiant," in the colors of orange or red or yellow, and may be used as the base material from which the strip 1 is cut. Otherwise, any paper, fabric, or other fibrous material in sheet form, may be pre-coated with materials having the characteristic of daylight fluorescence or good reflectivity of ultraviolet light, and cut to the desired shape for making the lure with or without a coating of adhesive being applied to its reverse surface. Materials such as lacquer, ink, pigments, and other coatings having the characteristic of daylight fluorescence are well-known in the industry, and a number of examples are described in U.S. Pat. Nos. 2,417,384, 2,475,529, and 2,809,945 and available in commerce under the designation of "Day-Glow" paints, lacquers and inks. Other suitable fluorescence and phosphorescent materials are described in Bulletin 65–600, published by United States Radium Corp. of Morristown, New Jersey.

Given the strip 1, as shown in FIG. 1, having a daylight fluorescent coating, preferably of a color which is known to be attractive to flies, and shown in FIG. 1 as orange, the strip 1 is perforated to provide a plurality of holes 2, 3, 4 and 5, extending through the substance thereof, as shown in FIG. 2. The hole 2 is provided for convenience of hanging the strip as on a nail or hook, or suspending it with a string or wire so that both its obverse (shown in FIGS. 1, 2 and 3) face and its reverse (FIG. 4) face are exposed for free view and access by circumambient flies.

About perforations 3, 4 and 5, and elsewhere on the obverse face of the strip 1, as indicated by the reference character W, fields of substantially opaque white ink are applied to mask, or at least reduce the ultraviolet light reflectance of, the coating underlying the fields W. The contour of the fields W is critical not only with respect to size, but with respect to shape, and is best described with relation to the pictorial illustrations shown in FIG. 3, where it will be observed that there is a cluster of flies in feeding posture about hole 3, and a comparable cluster of flies around hole 4 and 5. Similarly, there is a smaller cluster of flies in feeding posture at 6, a pair in copulating posture at 7 and at 8, as well as other individuals in the posture of rest. The fields W on FIG. 2 will be seen to correspond in location with all the individual and paired fly illustrations on FIG. 3. The fly illustrations on FIG. 3 are intended to be, and on the original drawing filed herewith are, of life size (but on the printed patent will be less than life size). The individual fields W shown on FIG. 2 also appear on FIG. 3 surrounding each individual fly or pair of flies pictorially illustrated, and it will be observed that the perimetrical contour of each field W is geometrically similar to the perimetrical contour of the fly or flies within it, but the field W is larger than the fly, so that the luminescent material underlying and extending outboard from the body, the head, the wings and the legs of each individual fly is masked or lightened for a distance on the order of 0.008 to 0.020 inches outwardly of the contour of the fly. For example, in the illustrations shown in FIG. 3, the legs of the flies are about 0.011 inches wide, and the white field underlying each leg extends outboard from it 0.014 inches on each side making the total width of the white field appendage underlying and outboard of the (black) leg about 0.039 inches.

The pictorial illustrations of the flies are preferably done in black, and are preferably in precise register with respect to the contour of their underlying white fields. Poor register between the illustration of the fly and the contour of the underlying white field reduces the effectiveness of the lure, apparently because live flies more readily recognize the artificiality of the representation if the register is poor.

FIG. 4 represents the appearance of the reverse side of the lure shown in FIG. 3. It is covered with any suitable formulation of fly food and fly toxin. In FIG. 4, the food-toxin is shown as granular to represent sugar which may be, and preferably is, also tinted or made ultraviolet reflective. If the paper from which the lure is made was obtained with a coating of pressure-sensitive adhesive on the obverse side, the food-toxin may be merely dusted on that coating of pressure-sensitive adhesive. Preferably the food-toxin composition is, at least in part, of a nature such as to glisten, a result which may be accomplished by including either granulated sugar or white sand in the composition. Typical compositions for the fly-food-toxin layer shown in FIG. 4 are:

EXAMPLE 1

| | |
|---|---|
| 2,2 dichlorovinyl dimethyl phosphate | 1% |
| Granulated sugar | 99% |

EXAMPLE 2

| | |
|---|---|
| 2,2 dichlorovinyl dimethyl phosphate | 0.50% |
| 0,0-Dimethyl 0-2,4,5 Trichlorophenyl phosphorothioate | 0.25% |
| Granulated sugar | 99.25% |

EXAMPLE 3

| | |
|---|---|
| 0-isopropoxyphenyl Methylcarbamate | 1.00% |
| Granulated sugar | 99.00% |

EXAMPLE 4

| | |
|---|---|
| Dimethyl (2,2,2 Trichloro-1-hydroxyethyl) phosphonate | 1% |
| Powdered Milk | 33% |
| Granulated sugar | 33% |
| Egg (white) albumin | 33% |

EXAMPLE 5

| | |
|---|---|
| 0,0,-Dimethyl S-(N-Methylcarbamoylmethyl) phosphorodithioate | 1% |
| Granulated sugar | 99% |

The percentages are by weight. To each of the compositions may be added an appropriate dye or pigment, quantum vis.

Each of the compositions stated in the foregoing Examples can be dusted on the pressure-sensitive adhesive coating, which is an integral part of the aforesaid "Strip-Tac-Fluoradiant" paper, after stripping the release sheet. If desired, other forms of fly toxin or bait may be applied in any conventional form and manner.

In use, the strip of paper, treated as aforesaid, is suspended in a fly-infested area, so that both the obverse and reverse surfaces are accessible by the flies, and nature takes its course. The results are illustrated by a typical test in a Peet-Grady chamber where a strip whose obverse surface was orange colored daylight fluorescent material, and whose pictorially represented flies were exactly as illustrated in FIG. 3 with the intervening field of white to mask the underlying fluorescence; and whose reverse surface was coated with the composition of Example 1 above. Under daylight conditions, with fresh air filling the Peet-Grady chamber, 500 live and active flies were introduced. Immediately the flies began to alight by the dozen on the obverse surface of the strip, within less than a minute some had crawled through holes 3, 4 and 5, and within 30 minutes all 500 flies were dead.

To illustrate the comparative fly alluring potential of daylight fluorescent materials vis-a-vis materials having good ultraviolet reflectivity, a test was carried out using three strips of paper each having a different type of coating comparable to that shown in FIG. 1, to wit:

i. "Day Glow" orange lacquer,
  ii. "silver" (probably tin or aluminum) foil,
  iii. "gold" (probably brass) foil.

All the strips had their reverse faces coated with the same bait but without toxin. The three strips were suspended, 4 inches apart, from the ceiling of a 6 × 6 × 6 feet Peet-Grady chamber under two 40-watt fluorescent lamps. Five hundred unsexed houseflies were released into the chamber and observed for 8 hours. The chamber was maintained at 80° F. and 65 percent relative humidity throughout the test. The flies on the respective strips were counted 5 minutes after release, and recounted at hourly intervals thereafter with the following results:

| Strip | 5 min. | 1 hr. | 2 hr. | 3 hr. | 4 hr. | 5 hr. | 6 hr. | 7 hr. | 8 hr |
|---|---|---|---|---|---|---|---|---|---|
| (i) | 32 | 32 | 22 | 22 | 24 | 85 | 81 | 83 | 81 |
| (ii) | 34 | 23 | 30 | 31 | 32 | 74 | 76 | 71 | 68 |
| (iii) | 36 | 26 | 4 | 11 | 14 | 32 | 22 | 16 | 24 |

The numeric values include flies reposing or moving on both the obverse and reverse faces of the respective strip at the time of each count. Obviously, strip (i) was the most attractive on the average, with strip (ii) a close second. In the same order is the maximum count. Although at 5 minutes, strip (i)

appears to have been the least attractive, it never again held that position. Strip (iii), on the whole, was decidedly inferior to the others, which may be because its reflectivity is least.

None of the coatings (i), (ii) and (iii) was phosphorescent, but to demonstrate the effect in darkness of luminescent materials which are phosphorescent, another test was made using two strips like (i) in the first test, and two more strips like (ii) in the first test, except the non-toxic bait on the reverse side of one of each type was coated with "Helecon" phosphorescent pigment number 2304. The four strips were suspended in a Peet-Grady chamber 4 inches apart in the order shown in the following table. The temperature and humidity were as before, but the chamber was maintained in total darkness for 12 hours, after which the fecal specks on each strip were counted with the following results:

| Strip | | Fecal Spots |
|---|---|---|
| (ii) | with phosphorescent bait | 128 |
| (i) | with plain bait | 68 |
| (ii) | with plain bait | 74 |
| (i) | with phosphorescent bait | 117 |

This test indicates that, in darkness, substantially more flies are attracted to phosphorescent material than are attracted to material which does not phosphoresce. Accordingly, when it is desired that the lure of the invention be effective in both darkness and light, the luminescent coating on the obverse side of the lure can be a mixture of luminescent materials which are fluorescent, with luminescent materials which are phosphorescent.

From the foregoing description, those skilled in the art should readily understand that the invention accomplishes its objects with eminent satisfaction and efficiency, without the necessity of spraying or otherwise contaminating the atmosphere or environs. While one complete embodiment of the lure has been described in detail, and various alternatives have been indicated, it is not to be understood that the invention is limited to the details of the foregoing disclosure.

Having thus described the invention, what is claimed and desired to be secured by Letters Patent is:

1. The process of luring flies to poison which comprises positioning adjacent a supply of poison, graphic silhouettes resembling flies on a luminescent background, with a nonluminescent field intervening said luminescent background and said graphic silhouettes.

2. The process of claim 1 in which the graphic silhouettes are black.

3. The process of claim 1 in which said nonluminescent field extends outboard of the graphic silhouettes about 0.008 to 0.020 inches outwardly of the boundary lines of said silhouettes.

4. The process of claim 3 in which the luminescent background is ultraviolet reflective.

5. The process of claim 1 in which said graphic silhouettes are pictorial illustrations of flies in at least one of:
   a. the posture of feeding;
   b. the posture of copulation; and
   c. the posture of rest.

6. A fly lure comprising a film having:
   a. an obverse surface which is at least one of
      i. luminescent, and
      ii. reflective to ultraviolet light,
   b. a reverse surface coated with fly poison, and said obverse surface having graphic silhouettes resembling a plurality of flies,
   c. a non-luminescent field intervening the obverse surface of (i) and (ii) and each graphic silhouette resembling a fly.

7. The lure of claim 6 in which said obverse surface is luminescent.

8. The lure of claim 6 in which said obverse surface is ultraviolet reflective.

9. The lure of claim 6 in which said nonluminescent field comprises substantially opaque masking material intervening said graphic silhouettes and said one of (i) and (ii).

10. The lure of claim 6 in which said field extends 0.008 to 0.020 inches outwardly of the graphic silhouettes.

11. The lure of claim 6 in which said graphic silhouettes are pictorial illustrations depicting flies in substantially biologically true size, shape and color.

12. The lure of claim 6 in which said graphic silhouettes are of size, shape and color resembling the biologically true size, shape and color of flies.

13. The lure of claim 6 in which said obverse surface is luminescent, fluorescent and phosphorescent.

14. A fly lure comprising a film having:
   a. an obverse surface which is at least one of
      i. luminescent, and
      ii. reflective to ultraviolet light,
   b. a reverse surface coated with fly poison, and said obverse surface having graphic silhouettes substantially triangular in shape,
   c. and a nonluminescent field intervening said obverse surfaces (i) and (ii) and said graphic silhouettes.

* * * * *